(12) United States Patent
Lin et al.

(10) Patent No.: US 10,311,809 B2
(45) Date of Patent: Jun. 4, 2019

(54) DUAL VIEW-FIELD DISPLAY AND FABRICATING METHOD AND DRIVING METHOD THEREOF

(71) Applicant: BOE TECHNOLOGY GROUP CO., LTD., Beijing (CN)

(72) Inventors: Chia Chiang Lin, Beijing (CN); Yanbing Wu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 58 days.

(21) Appl. No.: 14/770,235

(22) PCT Filed: Oct. 30, 2014

(86) PCT No.: PCT/CN2014/089925
§ 371 (c)(1),
(2) Date: Aug. 25, 2015

(87) PCT Pub. No.: WO2016/004710
PCT Pub. Date: Jan. 14, 2016

(65) Prior Publication Data
US 2016/0267859 A1    Sep. 15, 2016

(30) Foreign Application Priority Data

Jul. 8, 2014 (CN) .......................... 2014 1 0323170

(51) Int. Cl.
*G09G 3/36* (2006.01)
*G02F 1/1335* (2006.01)
(Continued)

(52) U.S. Cl.
CPC ..... *G09G 3/3607* (2013.01); *G02F 1/133512* (2013.01); *G09G 3/003* (2013.01);
(Continued)

(58) Field of Classification Search
CPC ......... G09G 3/2074; G09G 2300/0452; G09G 2300/0443; G09G 3/3607;
(Continued)

(56) References Cited

U.S. PATENT DOCUMENTS

2008/0001849 A1* 1/2008 Jin ........................ G02F 1/1323
345/4
2008/0231778 A1* 9/2008 Tsao .................. G02F 1/133516
349/106
(Continued)

FOREIGN PATENT DOCUMENTS

| CN | 101907796 A | 12/2010 |
| CN | 102194391 A | 9/2011 |
| CN | 104102043 A | 10/2014 |

OTHER PUBLICATIONS

Second Chinese Office Action dated Aug. 25, 2016; Appln. No. 201410323170.3.
(Continued)

*Primary Examiner* — Sanjiv D. Patel
(74) *Attorney, Agent, or Firm* — LADAS & PARRY LLP

(57) ABSTRACT

A dual view-field display and a fabricating method and a driving method thereof are provided. The dual view-field display includes a color filter substrate and an array substrate which are oppositely disposed. A slit grating is disposed on a side of the color filter substrate or the array substrate, and the color filter substrate includes a plurality of pixel units and a first black matrix surrounding each pixel unit. The slit grating includes light-shielding regions and light-transmitting regions, which are arranged at intervals in a matrix. The dual view-field display further comprises a light blocking portion configured for preventing light rays from leaking out of an upper-edge region and/or a lower-edge region of the light-transmitting region, which solves a problem that a viewing angle of a user of the dual view-field display is limited.

19 Claims, 6 Drawing Sheets

(51) Int. Cl.
    *G09G 3/00* (2006.01)
    *G02F 1/1333* (2006.01)
(52) U.S. Cl.
    CPC ............... *G02F 1/133514* (2013.01); *G02F 2001/133354* (2013.01); *G02F 2201/305* (2013.01); *G09G 2300/0452* (2013.01); *G09G 2320/028* (2013.01); *G09G 2320/0209* (2013.01); *G09G 2320/0238* (2013.01)
(58) Field of Classification Search
    CPC .... G09G 2320/0209; G09G 2300/0465; G02F 1/133514; G02F 1/133512; G02F 2201/52; G02F 1/136209; G02F 2201/40; G02F 1/133308; H04N 13/398; H04N 13/324; H04N 13/341; H04N 13/305; H04N 13/349; H04N 13/302
    See application file for complete search history.

(56)     References Cited

U.S. PATENT DOCUMENTS

| 2009/0079680 | A1 | 3/2009 | Yagiura | |
|---|---|---|---|---|
| 2011/0043715 | A1* | 2/2011 | Ohyama | G02B 27/2214 349/15 |
| 2011/0221655 | A1* | 9/2011 | Fukui | G09G 3/001 345/4 |
| 2012/0099215 | A1* | 4/2012 | Wu | G02F 1/133514 359/891 |
| 2012/0154696 | A1 | 6/2012 | Koyama | |
| 2012/0287506 | A1* | 11/2012 | Yao | G02B 5/201 359/491.01 |
| 2012/0327338 | A1* | 12/2012 | Kobayashi | G02F 1/133512 349/106 |
| 2013/0155034 | A1* | 6/2013 | Nakayama | G09F 9/35 345/204 |
| 2013/0241807 | A1* | 9/2013 | Tanaka | G09G 3/3406 345/32 |
| 2013/0286005 | A1* | 10/2013 | Liao | H04N 13/337 345/419 |
| 2014/0146261 | A1* | 5/2014 | Wu | G02F 1/134309 349/43 |
| 2015/0049068 | A1* | 2/2015 | Liao | G06T 15/00 345/206 |
| 2015/0332640 | A1* | 11/2015 | Liao | H04N 13/356 345/694 |

OTHER PUBLICATIONS

International Search Report and Written Opinion both dated Apr. 16, 2015; PCT/CN2014/089925.

First Chinese Office Action Appln. No. 201410323170.3; dated Mar. 28, 2016.

\* cited by examiner

DUAL VIEW-FIELD DISPLAY AND FABRICATING METHOD AND DRIVING METHOD THEREOF

TECHNICAL FIELD

Embodiments of the invention relate to a dual view-field display and a fabricating method and a driving method thereof.

BACKGROUND

With development of a display technology, a display technology that different images may be seen at two sides (for example, a left side and a right side) of one display screen can be more and more applied in a display field. A display apparatus fabricated by employing the above display technology is a dual view-field display apparatus. For example, when the dual view-field display apparatus is provided on an automobile, a driver may see road condition navigation information on the left side of the display apparatus, and a passenger on a co-driver's seat may observe other programs such as entertainment and leisure. Such a humanized "dual-vision" function nicely satisfies demands of different users for acquiring different kinds of information.

SUMMARY OF THE INVENTION

According to one aspect of an embodiment of the present invention, there is provided a dual view-field display, comprising a color filter substrate and an array substrate arranged opposite to each other, wherein a slit grating is disposed on a side of the color filter substrate or a side of the array substrate, and the color filter substrate comprises a plurality of pixel units and a first black matrix surrounding each pixel unit. The slit grating comprises light-shielding regions and light-transmitting regions which are arranged at intervals in a matrix; the light-transmitting region exposes parts of two pixel units adjacent in a horizontal direction. The dual view-field display further comprises a light blocking portion configured for preventing light rays from leaking out of at least one of an upper-edge region and a lower-edge region of the light-transmitting region.

According to another aspect of the embodiment of the present invention, there is provided a method of fabricating a dual view-field display, comprising:

providing an array substrate and a color filter substrate, wherein the color filter substrate comprises a plurality of pixel units and a first black matrix surrounding each pixel unit;

forming a slit grating, wherein the slit grating comprises light-shielding regions and light-transmitting regions, which are arranged at intervals in a matrix;

forming a light blocking portion which is configured for preventing light rays from leaking out of at least one of an upper-edge region and a lower-edge region of the light-transmitting region; and assembling the color filter substrate and the array substrate into a cell, and arranging the slit grating on a side of the color filter substrate or a side of the array substrate, so that the light-transmitting region exposes parts of two pixel units adjacent in a horizontal direction.

According to yet another aspect of the embodiment of the present invention, there is provided a method of driving a dual view-field display, wherein a pixel unit in the dual view-field display comprises a dark-state sub-pixel, the method comprises:

inputting a control signal to the array substrate;

controlling liquid crystals at a position corresponding to the dark-state sub-pixel to deflect by the array substrate according to the control signal, so that the dual view-field display displays a black picture at the position corresponding to the dark-state sub-pixel.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

Figure 1A:
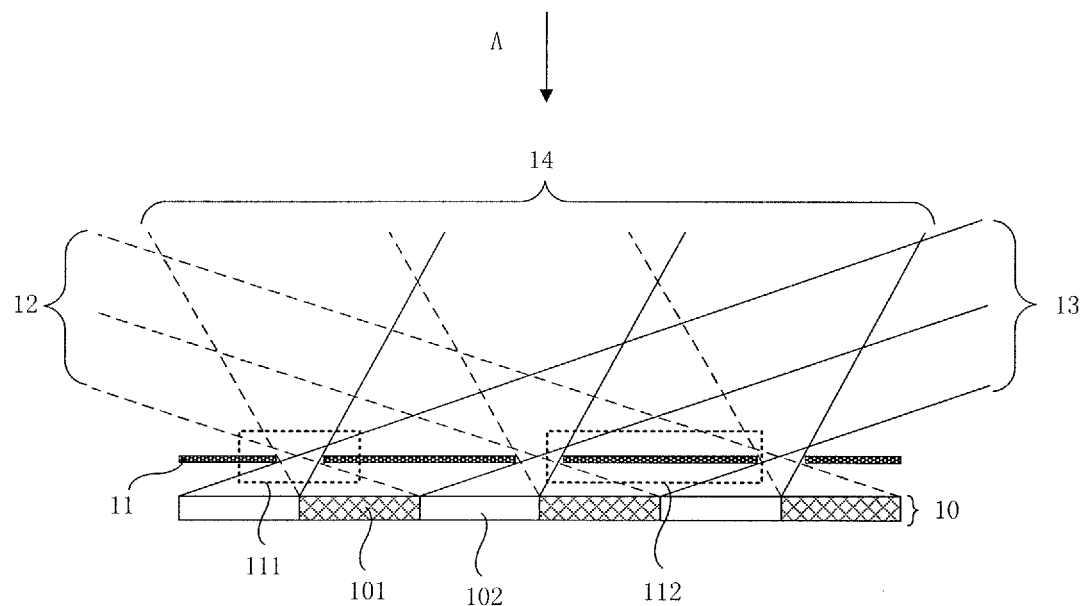
FIG. 1a is a partial structural schematic diagram of a known dual view-field display.
Figure 1B:
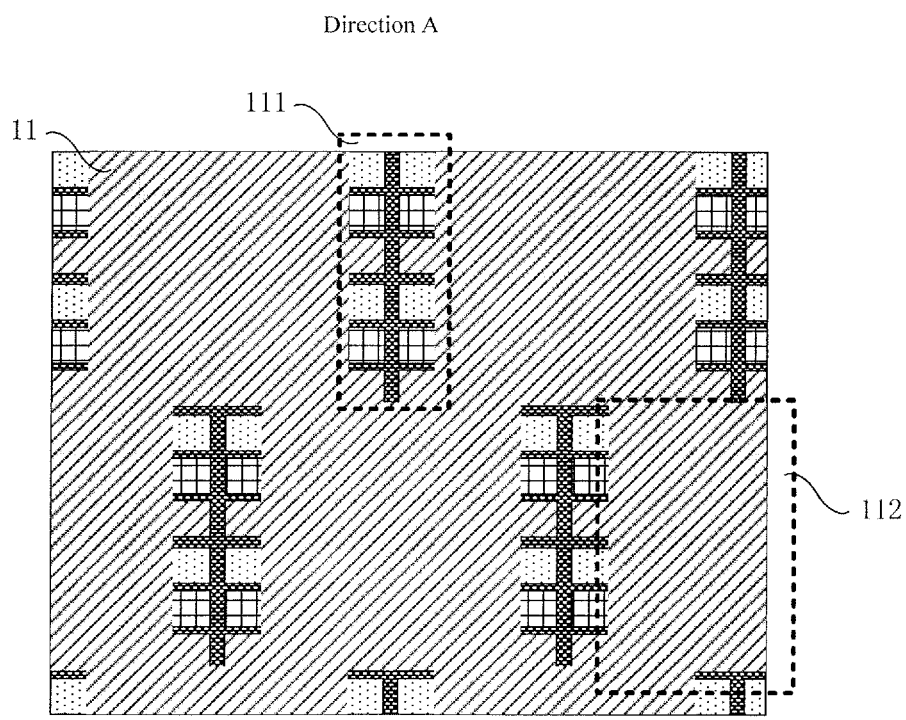
FIG. 1b is a partial structural top view of a known dual view-field display.

FIG. 1a shows a known dual-field-view display. A grating, for example, a slit grating 11, capable of improving fineness of a dual-vision image is fitted on a display panel 10. The slit grating 11 is an optical device composed of light-transmitting stripes and light-shielding stripes, which are arranged alternately. As shown in FIG. 1b, the light-transmitting stripes of the slit grating 11 correspond to light-transmitting regions 111, such that a small portion of a plurality of pixels can be exposed; the light-shielding stripes correspond to light-shielding regions 12, such that the plurality of pixels are all or partially shielded. In this way, a user located in a left visual region 12 on a left side of the display device may see part of pixels (including a plurality of first display regions 101) on the display panel 10 through the light-transmitting regions 111 of the slit grating 11; a user located in a right visual region 13 on the right side of the display apparatus may see the other part of pixels (including a plurality of second display regions 102) on the display panel 10 through the light-transmitting regions 111 of the slit grating 11. A region between the left visual region 12 and the right visual region 13 is a crosstalk region 14, and from this region, the pixels of the first display region 101 and the second display region 102 may be simultaneously seen, so displayed pictures may generate crosstalk, and the crosstalk region 14 typically does not serve as an observation region of the user.

However, because the slit grating 11 and a plane in which the pixels are located have a distance of hundreds of micrometers therebetween, the pixels may generate light leakage on partial regions of the light-transmitting regions 111. For example, when the user is located in the left visual region 12, light rays from the pixels, which should be seen in the right visual region 13, of the second display regions 102 may penetrate through upper edges and lower edges of the light-transmitting regions 111 to arrive at the left visual region 12, so that the pictures seen by the user located in the left visual region 12 generate crosstalk. In this way, even if the user is located in the left visual region 12 or the right visual region 13, when the user observes the display panel 10 from a slightly upper or lower position, he will still be affected by light rays emitted from the second display regions 102 or first display regions 101. Therefore, a viewing angle of the user is limited, and the display effect of the display device and the user experience are reduced.

Embodiments of the present invention provide a dual view-field display and a fabricating method and a driving method thereof, which solve the problem that a viewing angle of the user of the dual view-field display is limited.

In order to make objects, technical solutions and advantages of the embodiments of the present invention apparent, the technical solutions of the embodiments will be described in a clearly and fully understandable way in connection with the drawings related to the embodiments of the prevention invention. It is obvious that the described embodiments are just a part but not all of the embodiments of the present invention. Based on the described embodiments herein, those skilled in the art can obtain all other embodiments, without any inventive work, which should be within the scope of the present invention.

Unless otherwise defined, all technical and scientific terms used herein have same meanings as commonly understood by one skilled in the art of the present invention. The terms "first", "second" and the like used in the description and the claims of the present invention are used for distinguishing different components but not for describing any sequence, quantity or importance. Similarly, the terms "a/an", "one" and the like do not denote a limitation of quantity, but rather denote the presence of at least one of a referenced item. The terms "comprise", "include", and the like are intended to indicate that an element or article preceding "comprise" or "include" covers an element or article and equivalents thereof listed behind "comprise" and "include", and do not exclude other elements or articles. The terms "connected", or "coupled" and the like are not restricted to physical or mechanical connections or couplings, and can include electrical connections or couplings, whether direct or indirect. The terms "up", "down", "left", "right" and the like are used for describing relative positional relationships, and when absolute positions of to-be-described objects are changed, the relative positional relationships may also be correspondingly changed.

Figure 2A:
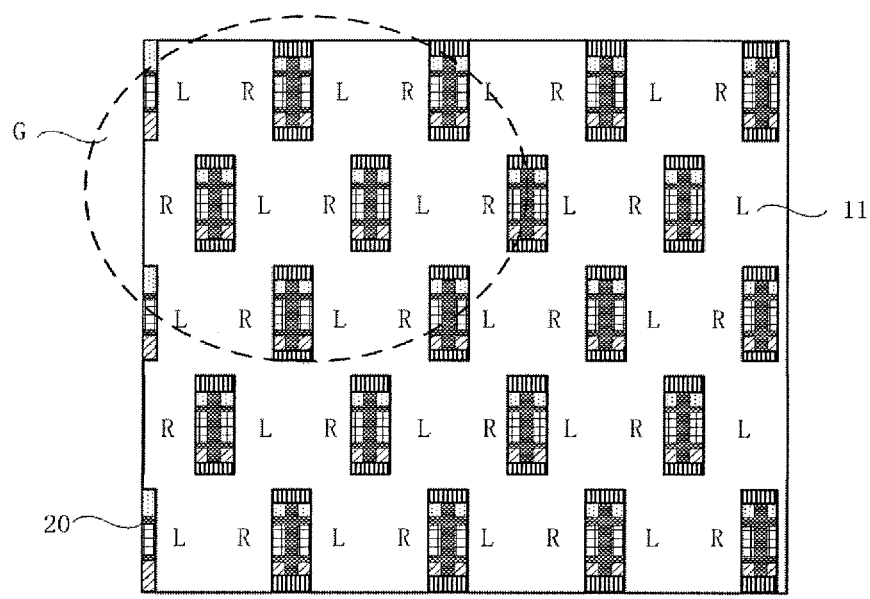
FIG. 2a is a partial structural schematic diagram of a dual view-field display provided by an embodiment of the present invention.
Figure 2B:
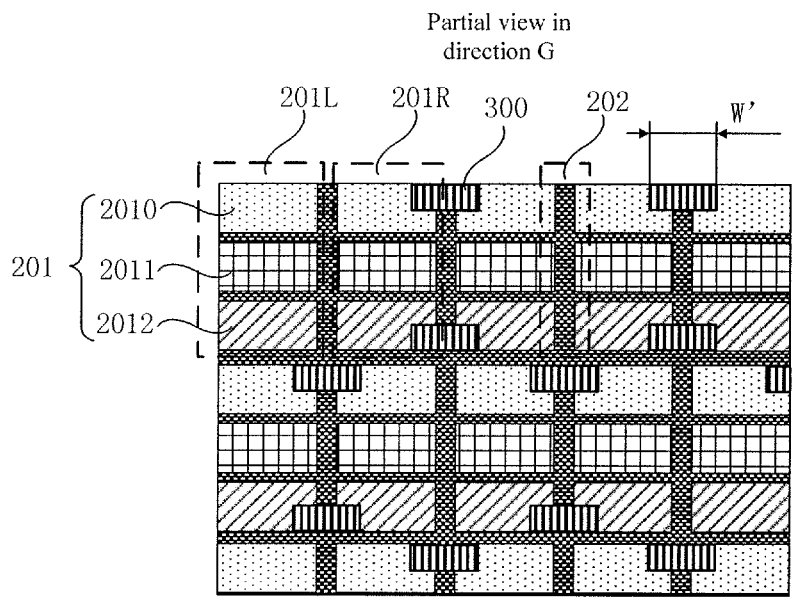
FIG. 2b is a structural schematic diagram of a pixel unit provided by an embodiment of the present invention.

An embodiment of the present invention provides a dual view-field display, as shown in FIG. 2a, comprising a color filter substrate 20 and an array substrate (not shown) arranged opposite to each other, wherein a slit grating 11 is disposed on one side of the color filter substrate 20 or on one side of the array substrate. As shown in FIG. 2b, the color filter substrate 20 comprises a plurality of pixel units 201 and a first black matrix 202 surrounding each pixel unit 201.

Figure 2C:
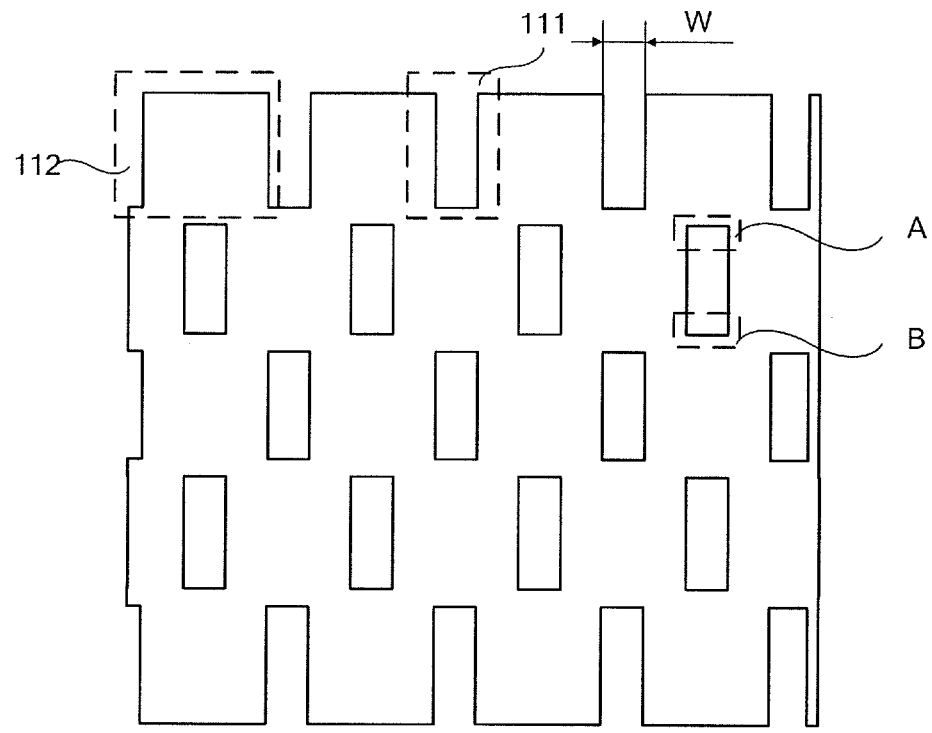
FIG. 2c is a structural schematic diagram of a slit grating provided by an embodiment of the present invention.

As shown in FIG. 2c, the slit grating 11 may comprise light-shielding regions 112 and light-transmitting regions 111, which are arranged at intervals in a matrix.

The light-transmitting region 111 exposes parts of two pixel units 201 adjacent in a horizontal direction.

In addition, as shown in FIG. 2b, the above dual view-field display may further comprise a light blocking portion 300 for preventing light rays from leaking out of an upper-edge region A and/or a lower-edge region B of the light-transmitting region 111.

The light-shielding region 112 may partially cover at least two pixel units 201 adjacent in a horizontal direction, and completely cover the first black matrix 202 corresponding to a position of the light-shielding region 112. The greater the number of pixel units 201 covered by the light-shielding region 112 is, the lower precision and difficulty of fabricating the grating are, but the fineness of the pictures can be reduced. Consequently, those skilled in the art may design a suitable size of the light-shielding region 112 when taking account of the display effect and production cost. The embodiment of the present invention is illustrated in a case where the light-shielding region 112 partially covers two pixel units 201 adjacent in a horizontal direction (cover two pixel units 201L and 201R adjacent in the horizontal direction in FIG. 2a).

It should be noted that, firstly, the slit grating 11 is disposed on one side of the color filter substrate 20 or one side of the array substrate, which refers to that, because the color filter substrate 20 and the array substrate are assembled into a cell, the slit grating 11 may be located on a side of the array substrate close to the color filter substrate 20; or located on a side of the color filter substrate 20 away from the array substrate, that is, located on a light emitting side of the display panel 10 composed of the color filter substrate 20 and the array substrate. The embodiment of the present invention is illustrated in a case where the slit grating 11 is located on the light emitting side of the display panel 10, but the specific position of the slit grating 11 is not defined.

Secondly, the light-shielding region 112 partially covers at least two adjacent pixel units 201, and a partial coverage described herein refers to that the light-shielding region 112 covers a majority of an area of the two adjacent pixel units 201L and 201R, as shown in FIG. 2c. The light-transmitting region 111 exposes parts of the two adjacent pixel units 201, which refers to that a small portion of pixel units 201 not covered by the light-shielding region 112 are exposed in the light-transmitting region 111, wherein the area of the light-shielding region 112 is greater than that of the light-transmitting region 111. In this way, a single light-shielding region 112 could shield both the pixel units 201L and 201R, such that a user located on the left side of the display panel sees the pixel unit 201L through the light-transmitting region 111 adjacent to the above light-shielding region 112; a user located on the right side of the display panel see the pixel unit 201R through the above light-transmitting region 111, to achieve a dual view-field.

In this case, by arranging the light blocking portion 300 for preventing light rays from leaking out of an upper-edge region A and/or a lower-edge region B of the light-transmitting region 111, when the user located on the left side of the display panel observes the display panel 10 from a slightly upper or lower position, the light blocking portion 300 may block the light rays of the pixel unit 201L from being transmitted into the eyes through the upper-edge region A and/or the lower-edge region B of the light-transmitting region 111 to cause picture crosstalk, so as to ensure that the user can clearly see the pixel unit 201R. It is the same when the user is located on the right side of the display panel.

The embodiment of the present invention provides a dual view-field display; the dual view-field display comprises a color filter substrate and an array substrate arranged opposite to each other, a slit grating is disposed on one side of the color filter substrate or one side of the array substrate. The color filter substrate comprises a plurality of pixel units and a first black matrix surrounding each pixel unit. The slit grating comprises light-shielding regions and light-transmitting regions, which are arranged at intervals in a matrix. Herein, the light-transmitting region exposes parts of two adjacent pixel units. The dual view-field display further comprises a light blocking portion for preventing the light rays from leaking out of an upper-edge region and/or a lower-edge region of the light-transmitting region. In this way, by means of the above light blocking portion, the light rays are effectively blocked from being transmitted into the eyes through the upper-edge region and/or the lower-edge region of the light-transmitting region of the slit grating. Thus, a viewing angle of the user in the left visual region or the right visual region is increased, and a crosstalk phenomenon is prevented from being generated when the user observes the pictures from a slightly upper or lower position.

In one example, the above light blocking portion 300 comprises a second black matrix 301 located on the color filter substrate, the second black matrix 301 corresponds to the upper-edge region A and/or lower-edge region B of the light-transmitting region 111.

For example, a width W' of the above second black matrix 301 is equal to or greater than a width W of the light-transmitting region 111. In this way, it could be ensured that the second black matrix 301 and the light-transmitting region 111 have no gap therebetween in a width direction, that is, a horizontal direction in FIG. 2b, thereby effectively preventing the light rays of the pixel unit 201 from being transmitted into the eyes through the upper-edge region A and/or the lower-edge region B of the light-transmitting region 111, which may cause the light leakage phenomenon and result in image crosstalk.

Figure 3A:
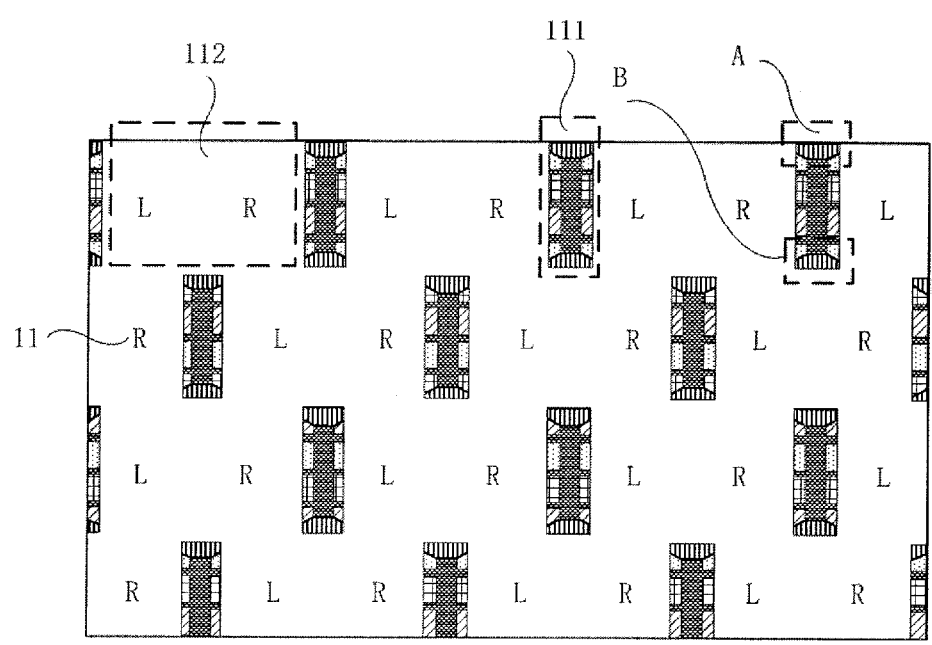
FIG. 3a is a partial structural schematic diagram of another dual view-field display provided by an embodiment of the present invention.
Figure 3B:
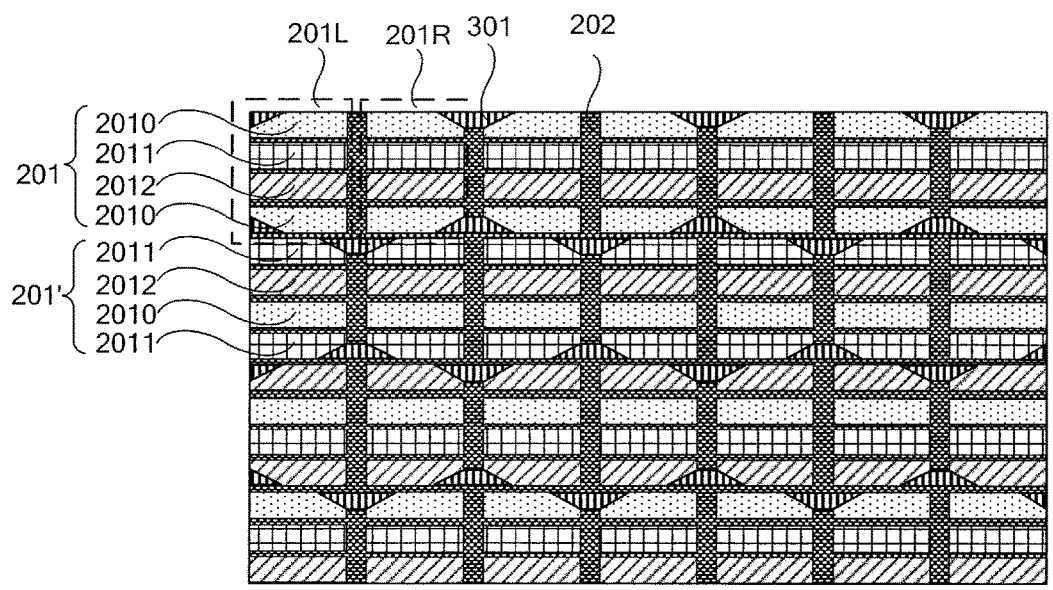
FIG. 3b is a structural schematic diagram of another pixel unit provided by an embodiment of the present invention.

In one example, as shown in FIG. 3b, the second black matrix 301 is in a trapezoidal shape, and a shorter base of a trapezoid is located in the light-transmitting region 111. In this way, the second black matrix 301 in a trapezoidal shape not only avoids the light leakage, but also solve the problem that an aperture ratio of the display apparatus is lowered due to that an area of sub-pixels which are in contact with the second black matrix 301 is greatly reduced because of the presence of the second black matrix 301.

In one example, the first black matrix 202 and the second black matrix 301 are of an integral structure. In this way, the second black matrix 301 is also fabricated at the same time when the first black matrix 202 is fabricated, so that the fabricating process is simplified.

It should be noted that, each pixel unit 201 may comprise at least one red sub-pixel 2010, one green sub-pixel 2011 and one blue sub-pixel 2012 which are arranged parallel with each other. An arranging sequence of respective sub-pixels is not limited in the present invention. As shown in FIG. 2a-FIG. 2c, the light-shielding region 112 of the slit grating covers two adjacent pixel units 201, and each pixel unit 201 only comprises a red sub-pixel 2010, a green sub-pixel 2011 and a blue sub-pixel 2012, which are sequentially arranged. Therefore, the pixel units 201 covered by each light-shielding region 112 are all identical; in this way, for the whole display panel, colors of the sub-pixels corresponding to the upper-edge regions A and the lower-edge regions B of the light-transmitting regions 111 are constant. For example, sub-pixels corresponding to the upper-edge regions A of the light-transmitting regions 111 are the red sub-pixels 2010, and sub-pixels corresponding to the lower-edge regions B of the light-transmitting regions 111 are the blue sub-pixels 2012. In a practical manufacturing process, the light blocking portion 300 may not completely shield 100% of the light rays emitted from the upper-edge region A and the lower-edge region B of the light-transmitting region 111 due to factors such as fabricating process and fabricating precision. In this way, the light rays incompletely shielded by the light blocking portion 300 are emitted into the eyes, such that the upper-edge region A of each light-transmitting region 111 emits red light, and the lower-edge region B of each light-transmitting region 111 emits blue light, thereby possibly causing a result that the whole display panel has constant-color crosstalk.

To further avoid the above crosstalk phenomenon, the pixel unit 201 in the embodiment of the present invention may comprise at least four sub-pixels, and colors of at least two sub-pixels are identical. For example, as shown in FIG. 3b, the pixel unit 201 comprises a red sub-pixel 2010, a green sub-pixel 2011, a blue sub-pixel 2012 and another red sub-pixel 2010 which are sequentially arranged. The pixel unit 201' at a lower edge of the pixel unit 201 comprises a green sub-pixel 2011, a blue sub-pixel 2012, a red sub-pixel 2010 and another green sub-pixel 2011 which are sequentially arranged. Other pixel units 201 will not be exemplified one by one herein. In this way, the constant-color crosstalk in the whole display panel due to that a number and a sequence of the sub-pixels in each pixel unit 201 are all identical can be avoided.

A case where the pixel unit 201 at least comprises four sub-pixels, and colors of at least two sub-pixels are identical is illustrated below.

Embodiment I

As shown in FIG. 3a, a light-shielding region 112 of a slit grating 11 partially covers two adjacent pixel units 201L and 201R, and completely covers a first black matrix 202 corresponding to the light-shielding region 112. As shown in FIG. 3b, each pixel unit 201 comprises four sub-pixels, thus, the constant-color crosstalk in the whole display panel due to that a number and a sequence of the sub-pixels in each pixel unit 201 are all identical can be avoided.

A light-transmitting region 111 exposes parts of two adjacent pixel units 201, and completely exposes a first black matrix 202 corresponding to the above light-transmitting region 111.

A second black matrix 301 in a trapezoidal shape is disposed on an upper-edge region A and a lower-edge region B of the light-transmitting region 111, for preventing light rays from leaking out of the upper-edge region A and the lower-edge region B of the light-transmitting region 111. A longer base of the second black matrix 301 is equal to or greater than a width L2 of the light-transmitting region 111; and the second black matrix 301 and the first black matrix 202 are of an integral structure.

In this embodiment, the pixel units 201L and 201R are respectively shielded by one light-shielding region 112, such that a user located on the left side of the display panel observes the pixel unit 201L through the light-transmitting region 111 adjacent to the above light-shielding region 112;

a user located on the right side of the display panel observes the pixel unit 201R through the above light-transmitting region 111. On such basis, by disposing the second black matrix 301, the light rays leaking out of the upper-edge region A and the lower-edge region B of the light-transmitting region 111 in the pixel units 201 can be absorbed by the second black matrix 301. In this way, when the user observes the display panel from a slightly upper or lower position within a viewing angle range of 5° with respect to a horizontal plane, the picture crosstalk of the dual view-field display can be reduced.

Embodiment II

Figure 4A:
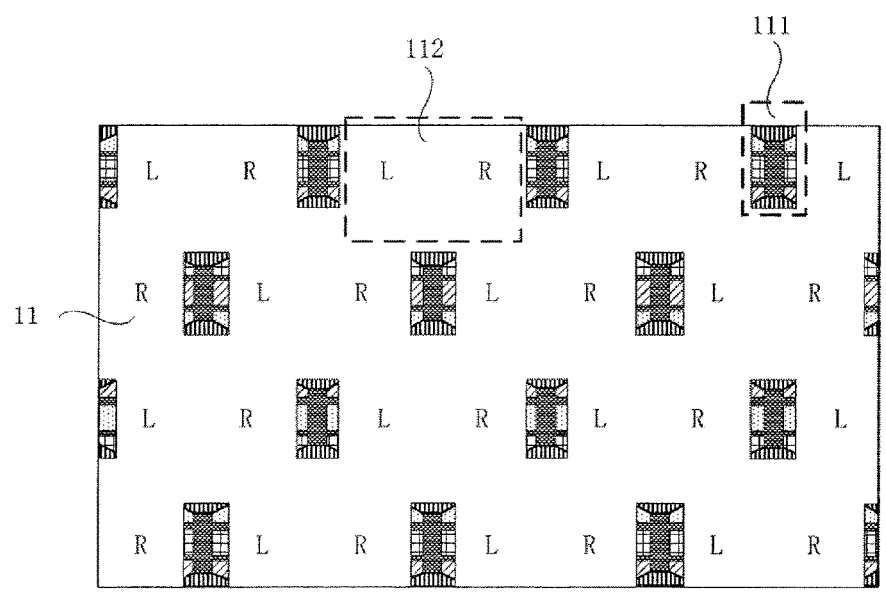
FIG. 4a is a partial structural schematic diagram of another dual view-field provided by an embodiment of the present invention.
Figure 4B:
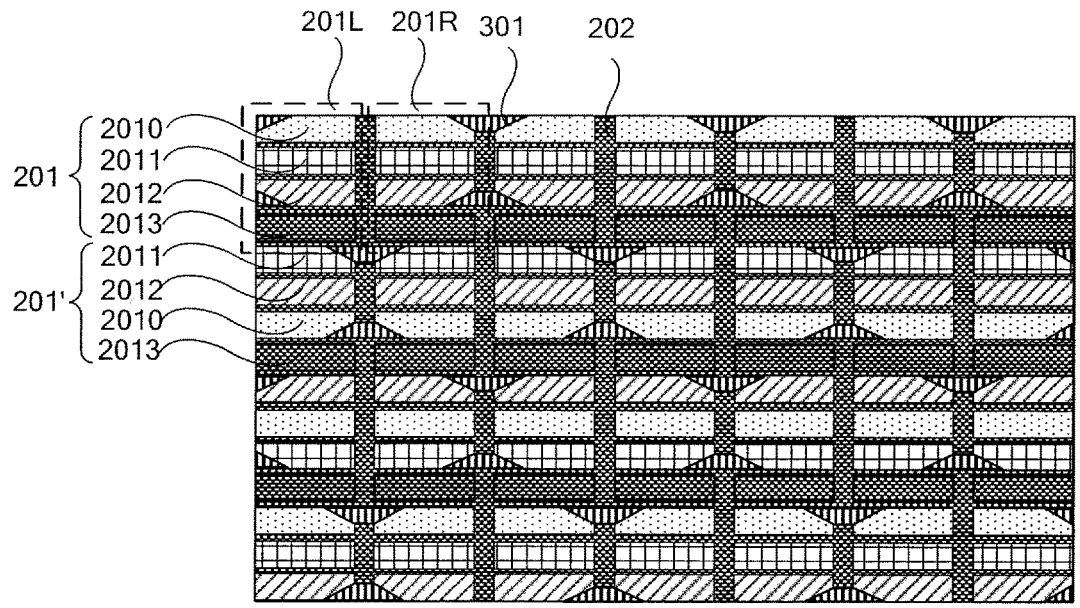
FIG. 4b is a structural schematic diagram of another pixel unit provided by an embodiment of the present invention.

As shown in FIG. 4b, this embodiment is different from Embodiment I in that, one of four sub-pixels comprised by each pixel unit 201 is a dark-state sub-pixel 2013 for displaying a black picture, so as to meet a requirement of further increasing a viewing angle range of a user.

The above dark-state sub-pixel 2013 may comprise a red sub-pixel 2010, or a green sub-pixel 2011, or a blue sub-pixel 2012.

The above light blocking portion 300 may comprise a portion of the dark-state sub-pixels 2013 which corresponds to the upper-edge region A and/or the lower-edge region B of the light-transmitting region 111. In this way, on the basis of disposing the above second black matrix 301, the above light blocking portion 300 further comprises the dark-state sub-pixel 2013 for displaying the black picture, so that the viewing angle range of the user can be further increased, and the light rays which may cause the picture crosstalk can be prevented from partially leaking out of the upper-edge region A and the lower-edge region B of the light-transmitting region 111.

It should be noted that the dark-state sub-pixel 2013 may comprise the above red sub-pixel 2010, or the above green sub-pixel 2011, or the above blue sub-pixel 2012. For example, when one of the red sub-pixel 2010, the green sub-pixel 2011 and the blue sub-pixel 2012 displays the black picture, this sub-pixel forms the above dark-state sub-pixel 2013. For example, as shown in FIG. 4b, the pixel unit 201 comprises a red sub-pixel 2010, a green sub-pixel 2011, a blue sub-pixel 2012 and a dark-state sub-pixel 2013 which are sequentially arranged, wherein the dark-state sub-pixel 2013 is formed by a red sub-pixel 2010. When the dual view-field display receives a control signal for displaying a black picture, a liquid crystal located at a position of the red sub-pixel 2010 in a last row of the pixel unit 201 deflects, such that no light rays penetrate through the above red sub-pixel 2010, at this moment, a position of the display panel, corresponding to the red sub-pixel 2010, displays the black picture, so that the red sub-pixel 2010 at this position forms the dark-state sub-pixel 2013.

Similarly, a pixel unit 201' at a lower edge of the pixel unit 201 comprises a green sub-pixel 2011, a blue sub-pixel 2012, a red sub-pixel 2010, and a dark-state sub-pixel 2013 formed by a green sub-pixel 2011, which are sequentially arranged. The pixel units at other positions are similar.

Because the arranging sequence of different sub-pixels in each pixel unit 201 is inconstant, it may prevent the whole display panel from generating constant-color crosstalk due to a number and a sequence of the sub-pixels in each pixel unit 201 are all identical.

In this embodiment, the pixel units 201L and 201R are respectively shielded by one light-shielding region 112, such that a user located on a left side of the display panel observes the pixel unit 201L through the light-transmitting region 111 adjacent to the above light-shielding region 112; a user located on a right side of the display panel observes the pixel unit 201R through the above light-transmitting region 111. On such basis, by disposing the second black matrix 301, the light rays leaking out of the upper-edge region A and the lower-edge region B of the light-transmitting region 111 by the pixel units 201 can be absorbed by the second black matrix 301. In addition, by disposing the dark-state sub-pixel 2013 for displaying the black picture in each pixel unit 201, the light rays leaking out of the upper-edge region A and the lower-edge region B of the light-transmitting region 111 can be reduced.

In this way, on the basis that the second black matrix 301 for absorbing leaked light rays is arranged, by changing sizes of the light-transmitting region 111 and the light-shielding region 112 of the slit grating 11 and disposing the dark-state sub-pixel 2013 in the pixel unit 201, when the user observes the display panel from a slightly upper or lower position within a viewing angle range of 20°, the displayed pictures will not generate crosstalk. Therefore, the viewing angle range of the user is increased. In addition, because each pixel unit 201 comprises four sub-pixels and one of the four sub-pixels is a dark-state sub-pixel 2013 for displaying a black picture, a resolution of the dual view-field display in a vertical direction is reduced to ¾. Thus, the resolution of the dual view-field display in the vertical direction can be further increased, while ensuring a relatively high viewing angle range.

Embodiment III

Figure 5A:
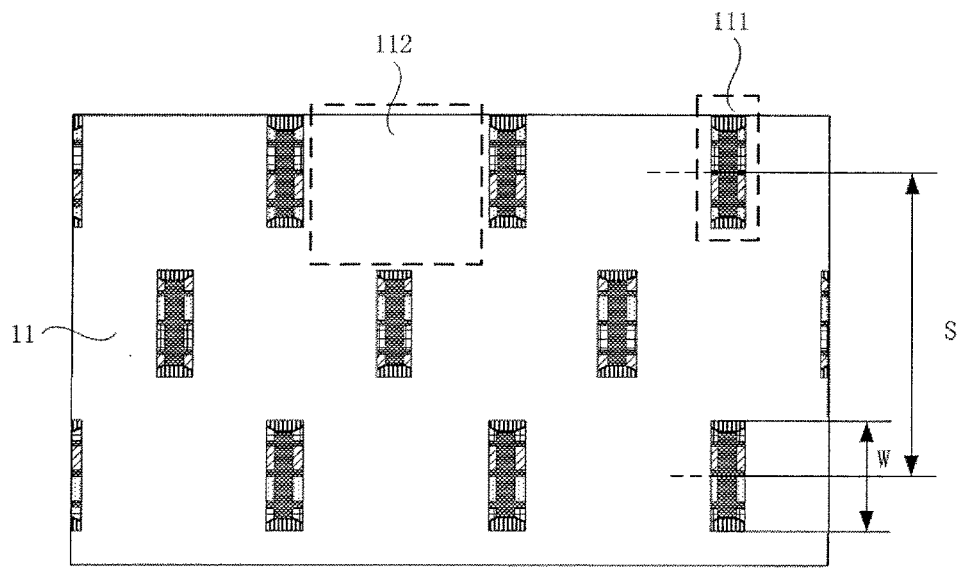
FIG. 5a is a partial structural schematic diagram of yet another dual view-field display provided by an embodiment of the present invention.
Figure 5B:
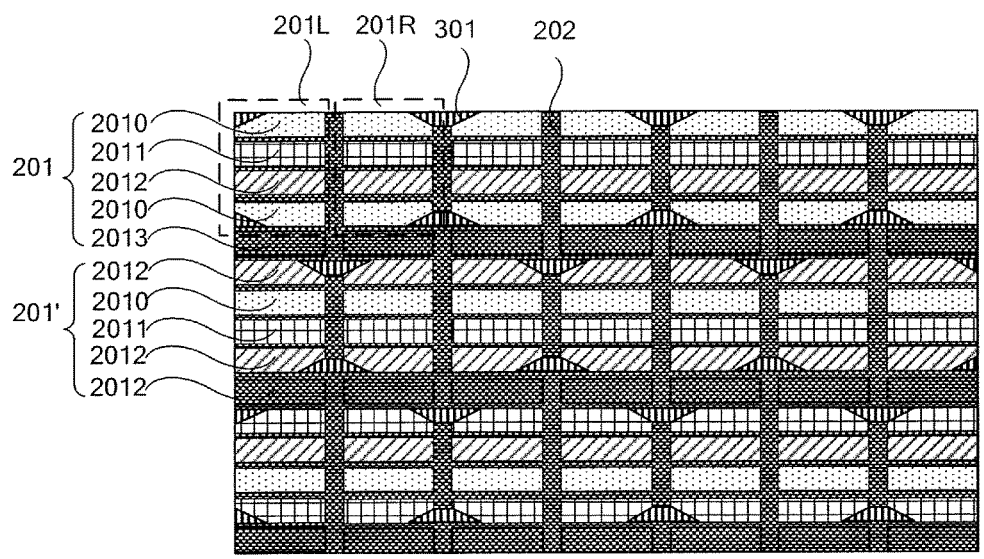
FIG. 5b is a structural schematic diagram of yet another pixel unit provided by an embodiment of the present invention.

As shown in FIG. 5a, this embodiment is different from Embodiment II in that, each pixel unit 201 comprises five pixels, wherein one sub-pixel is a dark-state sub-pixel 2013 for displaying a black picture.

The pixel unit 201 comprises a red sub-pixel 2010, a green sub-pixel 2011, a blue sub-pixel 2012, a red sub-pixel 2010 and a dark-state sub-pixel 2013 which are sequentially arranged. For example, the dark-state sub-pixel 2013 located in a last row of the pixel unit 201 is formed by a green sub-pixel 2011. When the dual view-field display receives a control signal for displaying a black picture, a liquid crystal located at a position of the green sub-pixel 2011 in the last row of the pixel unit 201 deflects, such that no light rays penetrate through the above green sub-pixel 2011, at this moment, a position of the display panel, corresponding to the green sub-pixel 2011, displays the black picture, so that the green sub-pixel 2011 at this position forms the dark-state sub-pixel 2013.

Similarly, a pixel unit 201' at a lower edge of the pixel unit 201 comprises a blue sub-pixel 2012, a red sub-pixel 2010, a green sub-pixel 2011, a blue sub-pixel 2012, and a dark-state sub-pixel 2013 formed by a red sub-pixel 2011, which are sequentially arranged. The pixel units at other positions are similar.

In this embodiment, the pixel units 201L and 201R are respectively shielded by one light-shielding region 112, such that a user located on a left side of the display panel observes the pixel unit 201L through the light-transmitting region 111 adjacent to the above light-shielding region 112; a user located on a right side of the display panel observes the pixel unit 201R through the above light-transmitting region 111. On such basis, by disposing the second black matrix 301, the light rays leaking out of the upper-edge region A and the lower-edge region B of the light-transmitting region 111 by the pixel units 201 can be absorbed the second black matrix 301. In addition, by disposing the dark-state sub-pixel 2013 for displaying the black picture in each pixel unit 201, the light rays leaked out of the upper-edge region A and the lower-edge region B of the light-transmitting region 111 can be reduced.

In this way, on the basis that the second black matrix 301 for absorbing leaked light rays is arranged, by changing sizes of the light-transmitting region 111 and the light-shielding region 112 of the slit grating 11 (because the pixel unit 201 covered by the light-shielding region 112 comprises five sub-pixels, the length of the light-shielding region 111 is increased) and disposing the dark-state sub-pixel 2013 in the pixel unit 201, when the user observes the display panel from a slightly upper or lower position within a viewing angle range of 20°, the displayed pictures will not generate crosstalk. Therefore, the viewing angle range of the user is increased. In addition, because each pixel unit 201 comprises five sub-pixels and one of the five sub-pixels is a dark-state sub-pixel 2013 for displaying a black picture, a resolution of the dual view-field display in a vertical direction is reduced to ⅘. Consequently, the resolution of a solution provided by Embodiment III is higher than that of a solution provided by Embodiment II. In addition, in Embodiment III, the length L of the light-transmitting region 111 is greater than that of the light-transmitting region 111 in Embodiment II, so that a displayed pattern in Embodiment II is finer than a displayed pattern in Embodiment III.

Certainly, the above embodiments is merely to illustrate the situation where the structure of the slit grating 11 and arrangement of the dark-state sub-pixel 2013 are used in the dual view-field display apparatus of 200 pixels per inch (PPI). Those skilled in the art may take account of factors such as resolution, crosstalk resistance degree, or picture fineness to design the structure of the slit grating 11 and the number of the dark-state sub-pixels 2013 according to the demand of an actual display performance. For example, for the display apparatus of higher PPI (400 PPI), the number of the sub-pixels in each pixel unit 201, including the number of the dark-state sub-pixels 2013, can be increased, to reach the purpose of reducing the picture crosstalk. Other solutions will not be exemplified one by one herein, which however should fall in the protection scope of the present invention.

The picture crosstalk can be reduced or eliminated by employing the above solution. For example, when the dark-state sub-pixel 2013 for displaying a black picture is arranged in the pixel unit 201, it is necessary to increase the area of the light-shielding region 112 to cover the dark-state sub-pixel 2013. Thus, in the embodiment of the present invention, while the slit grating 11 is fabricated, the length L of the light-transmitting region 111 may be less than or equal to half of a central spacing S between two adjacent light-transmitting regions 111 in a vertical direction, as shown in FIG. 5a.

An embodiment of the present invention further provides a fabricating method of a dual view-field display, comprising:

S101: providing an array substrate and a color filter substrate, wherein the color filter substrate comprises a plurality of pixel units 201 and a first black matrix 202 surrounding each pixel unit;

S102: forming a slit grating 11, wherein the slit grating 11 comprises light-shielding regions 112 and light-transmitting regions 111, which are arranged at intervals in a matrix;

S103: forming a light blocking portion 300 for preventing light rays from leaking out of an upper-edge region and/or a lower-edge region of the light-transmitting region 111; and

S104: assembling the color filter substrate and the array substrate into a cell, and arranging the slit grating 11 on one side of the color filter substrate or one side of array substrate, so that the light-transmitting region 111 exposes parts of two pixel units 201 adjacent in a horizontal direction.

It should be noted that, in the step S104, the slit grating 11 being disposed on one side of the color filter substrate or one side of the array substrate means that the slit grating 11 is located on a side of the array substrate close to the color filter substrate 20; or, located on a side of the color filter substrate 20 away from the array substrate, that is, located on a light emitting side of a display panel 10 composed of the color filter substrate 20 and the array substrate.

By forming the light blocking portion, the light rays are effectively prevented from being transmitted into eyes through the upper-edge regions A and/or lower-edge regions B of the light-transmitting regions 111. Therefore, the viewing angle of the user in a left visual region or the right visual region is increased, and the crosstalk phenomenon is prevented from being generated when the user observes the pictures from a slightly upper or lower position.

In one example, the step S103 comprises:

forming a second black matrix 301 at a position of the color filter substrate where corresponds to an upper-edge region A and/or a lower-edge region B of the light-transmitting region 111.

For example, a width W' of the second black matrix 301 is equal to or greater than a width W2 of the light-transmitting region 111. In this way, it can be ensured that the second black matrix 301 and the light-transmitting region 111 have no gap therebetween in a width direction, that is, a horizontal direction in FIG. 2b, thereby effectively preventing the light rays of the pixel units 201 from being transmitted into the eyes through the upper-edge region A and/or lower-edge region B of the light-transmitting region 111, which may cause the light leakage phenomenon and result in image crosstalk.

In one example, the step of forming a second black matrix 301 at a position of the color filter substrate where corresponds to an upper-edge region A and/or a lower-edge region B of the light-transmitting region 111 comprises:

forming a second black matrix 301 in a trapezoidal shape in an upper-edge region A and/or a lower-edge region B of the first black matrix 202. A shorter base of a trapezoid is located in the light-transmitting region 111. In this way, the second black matrix 301 in a trapezoidal shape not only avoids the light leakage, but also solve the problem that an aperture ratio of the display apparatus is lowered due to that an area of sub-pixels which are in contact with the second black matrix 301 is greatly reduced because of the presence of the second black matrix 301.

In one example, the first black matrix 202 and the second black matrix 301 is of an integral structure. In this way, the second black matrix 301 is also fabricated at the same time when the first black matrix 202 is fabricated, so that the fabricating process is simplified.

The picture crosstalk can be reduced or eliminated by employing the above solution. For example, when the dark-state sub-pixel 2013 for displaying a black picture is disposed in the pixel unit 201, it is necessary to increase the area of the light-shielding region 112 to cover the dark-state sub-pixel 2013. In one example, the above step S102 comprises:

While the slit grating 11 is fabricated, the length L of the light-transmitting region 111 is less than or equal to half of a central spacing S between two adjacent light-transmitting regions 111 in a vertical direction, as shown in FIG. 5a.

In one example, the above step S102 comprises: the light-shielding region 112 partially covers at least two adjacent pixel units in a horizontal direction, and completely covers a first black matrix 202 corresponding to the light-shielding region 112. The greater the number of pixel units 201 covered by the light-shielding region 112 is, the lower precision and difficulty of fabricating the grating are, but the fineness of the picture can be reduced. Consequently, those skilled in the art may design a suitable size of the light-shielding region 112 when taking account of the display effect and production cost. The embodiment of the present invention is illustrated in a case where the light-shielding region 112 partially covers two pixel units 201 adjacent in the horizontal direction (covers two pixel units 201L and 201R adjacent in the horizontal direction in FIG. 2a).

An embodiment of the present invention further provides a driving method of a dual view-field display (that is, a method for inputting a display signal to an array substrate of a dual view-field display in Embodiment II or III as described above so as to display images). In case that the pixel unit 201 comprises a dark-state sub-pixel 2013, the above method comprises:

S201: inputting a control signal to the array substrate.

S202: controlling liquid crystals at a position corresponding to the dark-state sub-pixel 2013 to deflect by the array substrate according to the control signal, so that the dual view-field display displays the above black picture on the position corresponding to the dark-state sub-pixel.

For example, the liquid crystals at the position corresponding to the dark-state sub-pixel 2013 deflect to a certain angle and shield light rays emitted by a backlight source of the display, such that a black picture is displayed at the position of the display panel of the dual view-field display where corresponds to the dark-state sub-pixel 2013.

In this embodiment, a portion of the dark-state sub-pixel, which corresponds to an upper-edge and/or a lower edge of the light-transmitting region of the slit grating, may form the light blocking portion. By means of the light blocking portion, the light rays are effectively prevented from being transmitted into the eyes from the upper-edge region or the lower-edge region of the light-transmitting region of the slit grating. Therefore, the viewing angle of a user in a left visual region or a right visual region is increased, and the crosstalk phenomenon is prevented from being generated when the user watches the pictures from a slightly upper or lower position.

What is described above is related to the illustrative embodiments of the disclosure only and not limitative to the scope of the disclosure; the scopes of the disclosure are defined by the accompanying claims.

This application claims priority of Chinese Patent Application No. 201410323170.3 filed on Jul. 8, 2014, the disclosure of which is incorporated herein by reference in its entirety as part of the present application.

What is claimed is:

1. A dual view-field display, comprising:
a color filter substrate, comprising a plurality of pixel units and a first black matrix surrounding each pixel unit, each of pixel units comprising at least three sub-pixels, each of at least three sub-pixels having a length along a first direction and a width along a second direction, the first direction being perpendicular to the second direction, and the length of each of at least three sub-pixels is larger than the width;
an array substrate arranged opposite to the color filter substrate;
a slit grating disposed on a side of the color filter substrate or a side of the array substrate, and
the slit grating comprising at least one light-shielding region and at least one light-transmitting region arranged at intervals in a matrix,
the at least one light-transmitting region being arranged over the two pixel units adjacent in the first direction and configured to expose each of the at least three sub-pixels of each of the two pixel units; and
a light blocking portion, disposed in the at least one light-transmitting region and configured for preventing light rays from leaking out of at least one of an upper-edge region and a lower-edge region of the at least one light-transmitting region,
the light blocking portion being symmetrical along a central axis of the first black matrix in the at least one light-transmitting region, and the central axis is extended along the second direction.

2. The dual view-field display according to claim 1, wherein the light blocking portion comprises a second black matrix, which is located on the color filter substrate and corresponds to the at least one of the upper-edge region and the lower-edge region of the at least one light-transmitting region.

3. The dual view-field display according to claim 2, wherein the pixel unit comprises at least one red sub-pixel, one green sub-pixel and one blue sub-pixel which are arranged parallel to each other.

4. The dual view-field display according to claim 1, wherein the pixel unit further comprises at least one dark-state sub-pixel configured for displaying a black picture;
the at least one dark-state sub-pixel comprises the red sub-pixel, or the green sub-pixel, or the blue sub-pixel;
the light blocking portion comprises a portion of the at least one dark-state sub-pixel which corresponds to the at least one of the upper-edge region and the lower-edge region of the at least one light-transmitting region.

5. The dual view-field display according to claim 1, wherein the slit grating comprising a plurality of light-transmitting regions arranged in rows and columns, each of light-transmitting regions is provided with the light-blocking portion, the light-blocking portions in two adjacent rows of the light-transmitting regions are configured to block two different colors of light.

6. The dual view-field display according to claim 2, wherein the first black matrix and the second black matrix are of an integral structure.

7. The dual view-field display according to claim 1, wherein a length of the at least one light-transmitting region is less than or equal to half of a central spacing between two adjacent light-transmitting regions.

8. The dual view-field display according to claim 1, wherein the at least one light-shielding region partially covers at least two pixel units adjacent in the first direction, and completely covers the first black matrix corresponding to a position of the at least one light-shielding region.

9. The dual view-field display according to claim 2, wherein a width of the second black matrix is equal to or greater than that of the at least one light-transmitting region.

10. A method of fabricating a dual view-field display, comprising:
providing an array substrate and a color filter substrate, wherein the color filter substrate comprises a plurality of pixel units and a first black matrix surrounding each pixel unit, each of pixel units comprising at least three sub-pixels, each of at least three sub-pixels having a length along a first direction and a width along a second direction, the first direction being perpendicular to the second direction, and the length of each of at least three sub-pixels is larger than the width;

forming a slit grating, the slit grating comprising at least one light-shielding region and at least one light-transmitting region arranged at intervals in a matrix;

forming a light blocking portion, the light blocking portion being configured for preventing light rays from leaking out of at least one of an upper-edge region and a lower-edge region of the at least one light-transmitting region, the light blocking portion being symmetrical along a central axis of the first black matrix in the at least one light-transmitting region, and the central axis is extended along the second direction; and assembling the color filter substrate and the array substrate into a cell, and arranging the slit grating on a side of the color filter substrate or a side of the array substrate, so that the at least one light-transmitting region being configured to expose each of the at least three sub-pixels of each of two pixel units adjacent in the first direction.

11. The method according to claim 10, wherein a length of the at least one light-transmitting region is less than or equal to half of a central spacing between two adjacent light-transmitting regions.

12. The method according to claim 10, wherein the at least one light-shielding region partially covers at least two pixel units adjacent in the first direction, and completely covers the first black matrix corresponding to a position of the at least one light-shielding region.

13. A method of driving the dual view-field display according to claim 4, comprising:

inputting a control signal to the array substrate;

controlling liquid crystals at a position corresponding to the at least one dark-state sub-pixel to deflect by the array substrate according to the control signal, so that the dual view-field display displays a black picture at the position corresponding to the at least one dark-state sub-pixel.

14. The dual view-field display according to claim 2, wherein the pixel unit further comprises at least one dark-state sub-pixel configured for displaying a black picture;

the at least one dark-state sub-pixel comprises the red sub-pixel, or the green sub-pixel, or the blue sub-pixel;

the light blocking portion comprises a portion of the at least one dark-state sub-pixel which corresponds to the at least one of the upper-edge region and the lower-edge region of the at least one light-transmitting region.

15. The dual view-field display according to claim 3, wherein the pixel unit further comprises at least one dark-state sub-pixel configured for displaying a black picture;

the at least one dark-state sub-pixel comprises the red sub-pixel, or the green sub-pixel, or the blue sub-pixel;

the light blocking portion comprises a portion of the at least one dark-state sub-pixel which corresponds to the at least one of the upper-edge region and the lower-edge region of the at least one light-transmitting region.

16. The method according to claim 10, wherein the step of forming the light blocking portion comprises:

forming a second black matrix at a position of the color filter substrate where corresponds to the at least one of the upper-edge region and the lower-edge region of the at least one light-transmitting region.

17. The method according to claim 16, wherein the step of forming a second black matrix at a position of the color filter substrate where corresponds to the at least one of the upper-edge region and the lower-edge region of the at least one light-transmitting region comprises:

forming a second black matrix in a trapezoidal shape at a position of the color filter substrate where corresponds to the at least one of an upper-edge region and a lower-edge region of the at least one light-transmitting region; wherein a shorter base of the trapezoid is located in the at least one light-transmitting region.

18. The method according to claim 16, wherein the first black matrix and the second black matrix are of an integral structure.

19. The method according to claim 16, wherein a width of the second black matrix is equal to or greater than that of the at least one light-transmitting region.

* * * * *